US007117880B2

(12) United States Patent
Veinotte et al.

(10) Patent No.: US 7,117,880 B2
(45) Date of Patent: Oct. 10, 2006

(54) APPARATUS AND METHOD OF CHANGING PRINTED CIRCUIT BOARDS IN A FUEL VAPOR PRESSURE MANAGEMENT APPARATUS

(75) Inventors: Andre Veinotte, Dresden (CA); Paul Perry, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 198 days.

(21) Appl. No.: 10/667,963

(22) Filed: Sep. 23, 2003

(65) Prior Publication Data

US 2004/0168740 A1 Sep. 2, 2004

Related U.S. Application Data

(60) Provisional application No. 60/412,576, filed on Sep. 23, 2002.

(51) Int. Cl.
*F16K 27/00* (2006.01)

(52) U.S. Cl. .................... 137/15.19; 137/554; 137/560

(58) Field of Classification Search ............. 137/15.19, 137/493.9, 554, 560
See application file for complete search history.

(56) References Cited

U.S. PATENT DOCUMENTS

| | | | | |
|---|---|---|---|---|
| 322,084 A | | 7/1885 | Wilder | |
| 2,204,706 A | | 6/1940 | Searle | |
| 2,318,962 A | | 5/1943 | Parker | |
| 2,679,946 A | | 6/1954 | Friend | |
| 3,741,232 A | | 6/1973 | Soberski | |
| 4,368,366 A | | 1/1983 | Kitamura et al. | |
| 4,842,015 A | | 6/1989 | Haak et al. | |
| 4,951,701 A | | 8/1990 | Boehmer | |
| 5,036,823 A | | 8/1991 | MacKinnon | |
| 5,191,870 A | | 3/1993 | Cook | |
| 5,224,511 A | | 7/1993 | Schnettler | |
| 5,253,629 A | | 10/1993 | Fornuto et al. | |
| 5,373,822 A | | 12/1994 | Thompson | |
| 5,449,018 A | | 9/1995 | Harris | |
| 5,524,662 A | | 6/1996 | Benjey et al. | |
| 5,570,015 A | * | 10/1996 | Takaishi et al. | 137/554 |
| 5,706,855 A | * | 1/1998 | Heiniger | 137/554 |
| 5,863,025 A | | 1/1999 | Noya | |

(Continued)

FOREIGN PATENT DOCUMENTS

WO WO-01/38716 5/2001

(Continued)

OTHER PUBLICATIONS

U.S. Appl. No. 10/758,239, filed Jan. 16, 2004, Veinotte, Flow Sensor Integrated with Leak Detection for Purge Valve Diagnostic.

(Continued)

*Primary Examiner*—Stephen M. Hepperle

(57) ABSTRACT

An apparatus and a method for managing fuel vapor pressure in a fuel system that supplies fuel to an internal combustion engine. The fuel vapor pressure management apparatus performs leak detection on a headspace of the fuel system, performs excess negative pressure relief of the headspace, and performs excess positive pressure relief of the headspace. The apparatus includes a housing, a pressure operable device, and a printed circuit board. The housing defines an interior chamber. The pressure operable device separates the interior chamber into first and second portions. And the pressure operable device includes a poppet that moves along an axis and a seal that is adapted to cooperatively engage the poppet. The printed circuit board is supported by the housing in the interior chamber. And the printed circuit board includes a sensor that is adapted to be actuated by movement of the poppet along the axis.

20 Claims, 8 Drawing Sheets

U.S. PATENT DOCUMENTS

| | | | | |
|---|---|---|---|---|
| 5,911,209 | A | 6/1999 | Kouda et al. | |
| 6,021,652 | A * | 2/2000 | Walker | 137/554 |
| 6,213,153 | B1 * | 4/2001 | Hayashi et al. | 137/884 |
| 6,328,021 | B1 | 12/2001 | Perry et al. | |
| 6,450,152 | B1 | 9/2002 | Everingham | |
| 6,450,153 | B1 | 9/2002 | Perry | 123/519 |
| 6,460,566 | B1 | 10/2002 | Perry et al. | |
| 6,478,045 | B1 | 11/2002 | Perry | |
| 6,564,780 | B1 | 5/2003 | Hanai et al. | |
| 2002/0069692 | A1 | 6/2002 | Cook et al. | 73/49.7 |

FOREIGN PATENT DOCUMENTS

| | | |
|---|---|---|
| WO | WO 01/86135 A | 9/2001 |
| WO | WO 01/77514 A | 10/2001 |

OTHER PUBLICATIONS

U.S. Appl. No. 10/758,273, filed Jan. 16, 2004, Veinotte et al., Flow Sensor for Purge Valve Diagnostic.

U.S. Appl. No. 10/758,272, filed Jan. 16, 2004, Veinotte et al., Flow Sensor for Purge Valve Diagnostic.

U.S. Appl. No. 10/758,238, filed Jan. 16, 2004, Veinotte, Flow Sensor Integrated with Leak Detection for Purge Valve Diagnostic.

U.S. Appl. No. 10/736,773, filed Dec. 17, 2003, Perry et al., Apparatus, System and Method of Establishing a Test Threshold for a Fuel Vapor Leak Detection System.

U.S. Appl. No. 10/170,420, filed Jun. 14, 2002, Veinotte, Apparatus and Method for Preventing Resonance in a Fuel Vapor Pressure Management Apparatus.

U.S. Appl. No. 10/667,903, filed Sep. 23, 2003, Veinotte et al., Rationality Testing for a Fuel Vapor Pressure Management Apparatus.

U.S. Appl. No. 10/667,902, filed Sep. 23, 2003, Perry et al., In-Use Rate Based Calculation for a Fuel Vapor Pressure Management Apparatus.

U.S. Appl. No. 10/171,469, filed Jun. 14, 2002, Veinotte et al., A method of Managing Fuel Vapor Pressure in a Fue System.

U.S. Appl. No. 10/171,470, filed Jun. 14, 2002, Veinotte, Bi-Directional Flow Seal for a Fuel Vapor Pressure Management Apparatus.

U.S. Appl. No. 10/667,965, Sep. 23, 2003, Veinotte, Method of Designing a Fuel Vapor Pressure Management Apparatus.

U.S. Appl. No. 10/171,471, filed Jun. 14, 2002, Veinotte, Apparatus and Method for Calibrating a Fuel Management Apparatus.

U.S. Appl. No. 10/171,472, filed Jun. 14, 2002, Veinotte, A Poppet for a Fuel Vapor Pressure Management Apparatus.

U.S. Appl. No. 10/171,473, filed Jun. 14, 2002, Veinotte, Method for Fuel Vapor Pressure Management.

U.S. Appl. No. 10/170,395, filed Jun. 14, 2002, Veinotte, Apparatus for Fuel Vapor Pressure Management.

U.S. Appl. No. 10/170,397, filed Jun. 14, 2002, Veinotte, Fuel System Including an Apparatus for Fuel Vapor Pressure Management Apparatus.

PCT International Search Report (PCT/CA 03/01440), Mailed Jan. 26, 2004.

* cited by examiner

APPARATUS AND METHOD OF CHANGING PRINTED CIRCUIT BOARDS IN A FUEL VAPOR PRESSURE MANAGEMENT APPARATUS

CROSS REFERENCE TO RELATED APPLICATIONS

This application claims the benefit of the earlier filing date of U.S. Provisional Application No. 60/412,576, filed 23 Sep. 2002, which is incorporated by reference herein in its entirety.

Related co-pending U.S. Utility application Ser. Nos. 10/170,397, 10/170,395, 10/171,473, 10/171,472, 10/171,471, 10/171,470, 10/171,469, and 10/170,420, all of which were filed 14 Jun. 2002, are incorporated by reference herein in their entirety.

Related co-pending applications filed concurrently herewith are identified as 60/412,556 ("Method Of Designing A Fuel Vapor Pressure Management Apparatus"), 60/412,578 ("In-Use Rate Based Calculation For A Fuel Vapor Pressure Management Apparatus"), and 60/412,577 ("Rationality Testing For A Fuel Vapor Pressure Management Apparatus"), all of which are incorporated by reference herein in their entirety.

FIELD OF THE INVENTION

A fuel vapor pressure management apparatus and method that manages pressure and detects leaks in a fuel system. In particular, a fuel vapor pressure management apparatus and method that vents positive pressure, vents excess negative pressure, and uses evaporative natural vacuum to perform a leak diagnostic.

BACKGROUND OF THE INVENTION

Conventional fuel systems for vehicles with internal combustion engines can include a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

In such conventional fuel systems, excess fuel vapor can accumulate immediately after engine shutdown, thereby creating a positive pressure in the fuel vapor pressure management system. Excess negative pressure in closed fuel systems can occur under some operating and atmospheric conditions, thereby causing stress on components of these fuel systems. Thus, it is believed that there is a need to vent, or "blow-off," the positive pressure, and to vent, or "relieve," the excess negative pressure. Similarly, it is also believed to be desirable to relieve excess positive pressure that can occur during tank refueling. Thus, it is believed that there is a need to allow air, but not fuel vapor, to exit the tank at high flow rates during tank refueling. This is commonly referred to as onboard refueling vapor recovery (ORVR).

SUMMARY OF THE INVENTION

The present invention provides a fuel vapor pressure management apparatus of a fuel system that supplies fuel to an internal combustion engine. The fuel vapor pressure management apparatus performs leak detection on a headspace of the fuel system, performs excess negative pressure relief of the headspace, and performs excess positive pressure relief of the headspace. The apparatus includes a housing, a pressure operable device, and a printed circuit board. The housing defines an interior chamber. The pressure operable device separates the interior chamber into first and second portions. And the pressure operable device includes a poppet that moves along an axis and a seal that is adapted to cooperatively engage the poppet. The printed circuit board is supported by the housing in the interior chamber. And the printed circuit board includes a sensor that is adapted to be actuated by movement of the poppet along the axis.

The present invention also provides a method of method of assembling a fuel vapor pressure management apparatus of a fuel system that supplies fuel to an internal combustion engine. The fuel vapor pressure management apparatus performs leak detection on a headspace of the fuel system, performs excess negative pressure relief of the headspace, and performs excess positive pressure relief of the headspace. The method includes providing first and second housing parts, locating within the first housing part a printed circuit board, and sandwiching between the first and second housing parts a pressure operable device. The first and second housing portions are adapted to cooperatively engage one another so as to form a housing that defines an interior chamber. The pressure operable device separates the interior chamber into first and second portions.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

As it is used in this description, "atmosphere" generally refers to the gaseous envelope surrounding the Earth, and "atmospheric" generally refers to a characteristic of this envelope.

As it is used in this description, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

Also, as it is used in this description, "headspace" refers to the variable volume within an enclosure, e.g. a fuel tank, that is above the surface of the liquid, e.g., fuel, in the enclosure. In the case of a fuel tank for volatile fuels, e.g., gasoline, vapors from the volatile fuel may be present in the headspace of the fuel tank.

Figure 1:
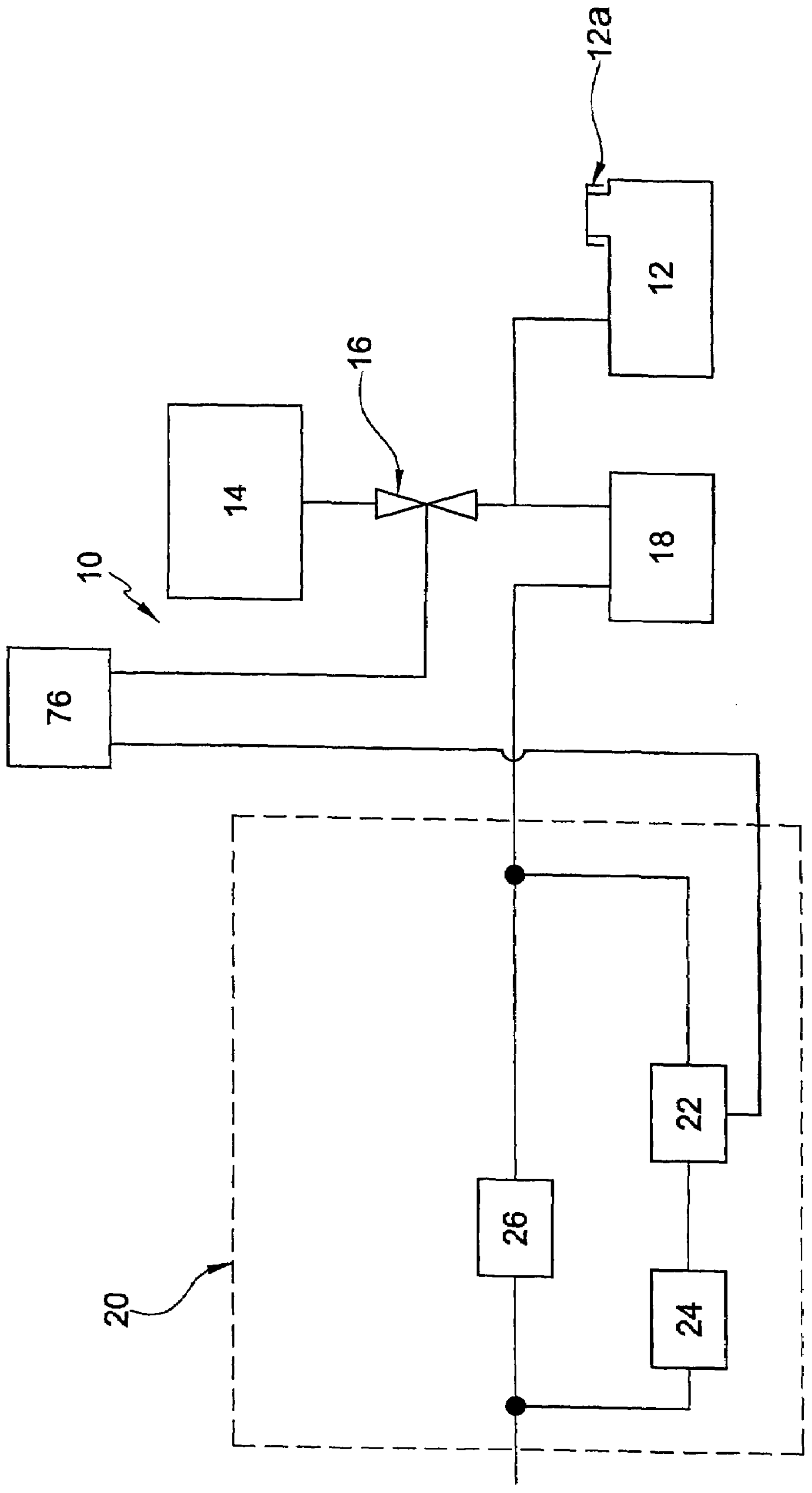
FIG. 1 is a schematic illustration of a fuel system, in accordance with the detailed description of the preferred embodiment, which includes a fuel vapor pressure management apparatus.

Referring to FIG. 1, a fuel system 10, e.g., for an engine (not shown), includes a fuel tank 12, a vacuum source 14 such as an intake manifold of the engine, a purge valve 16, a charcoal canister 18, and a fuel vapor pressure management apparatus 20.

The fuel vapor pressure management apparatus 20 performs a plurality of functions including signaling 22 that a first predetermined pressure (vacuum) level exists, "vacuum relief" or relieving negative pressure 24 at a value below the first predetermined pressure level, and "pressure blow-off" or relieving positive pressure 26 above a second pressure level.

Other functions are also possible. For example, the fuel vapor pressure management apparatus 20 can be used as a vacuum regulator, and in connection with the operation of the purge valve 16 and an algorithm, can perform large leak detection on the fuel system 10. Such large leak detection could be used to evaluate situations such as when a refueling cap 12*a* is not replaced on the fuel tank 12.

It is understood that volatile liquid fuels, e.g., gasoline, can evaporate under certain conditions, e.g., rising ambient temperature, thereby generating fuel vapor. In the course of cooling that is experienced by the fuel system 10, e.g., after the engine is turned off, a vacuum is naturally created by cooling the fuel vapor and air, such as in the headspace of the fuel tank 12 and in the charcoal canister 18. According to the present description, the existence of a vacuum at the first predetermined pressure level indicates that the integrity of the fuel system 10 is satisfactory. Thus, signaling 22 is used to indicate the integrity of the fuel system 10, i.e., that there are no appreciable leaks. Subsequently, the vacuum relief 24 at a pressure level below the first predetermined pressure level can protect the fuel tank 12, e.g., can prevent structural distortion as a result of stress caused by vacuum in the fuel system 10.

After the engine is turned off, the pressure blow-off 26 allows excess pressure due to fuel evaporation to be vented, and thereby expedite the occurrence of vacuum generation that subsequently occurs during cooling. The pressure blow-off 26 allows air within the fuel system 10 to be released while fuel vapor is retained. Similarly, in the course of refueling the fuel tank 12, the pressure blow-off 26 allows air to exit the fuel tank 12 at a high rate of flow.

At least two advantages are achieved in accordance with a system including the fuel vapor pressure management apparatus 20. First, a leak detection diagnostic can be performed on fuel tanks of all sizes. This advantage is significant in that previous systems for detecting leaks were not effective with known large volume fuel tanks, e.g., 100 gallons or more. Second, the fuel vapor pressure management apparatus 20 is compatible with a number of different types of the purge valve, including digital and proportional purge valves.

Figure 2A:
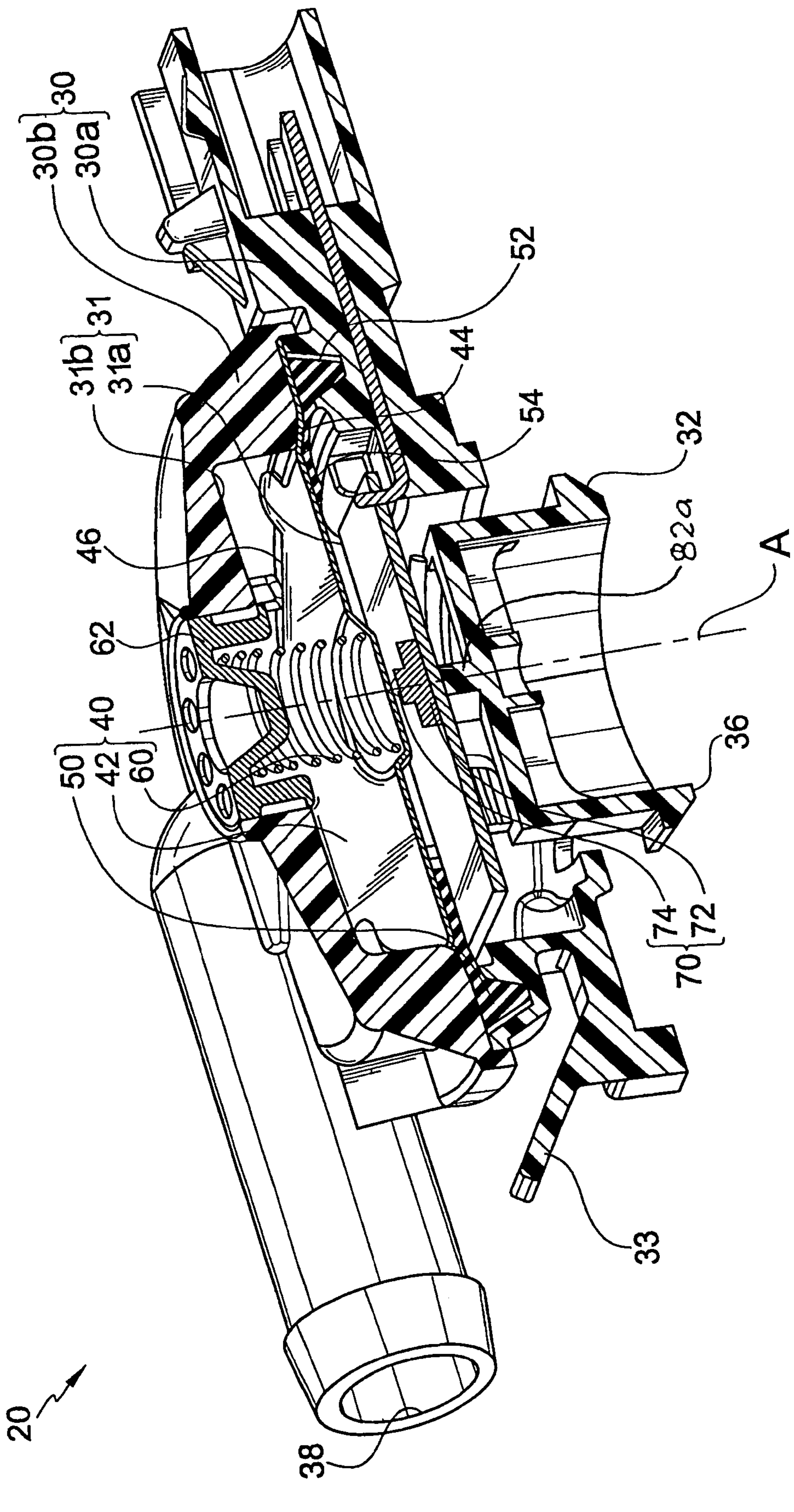
FIG. 2A is a first cross sectional view of the fuel vapor pressure management apparatus illustrated in FIG. 1.

FIG. 2A shows an embodiment of the fuel vapor pressure management apparatus 20 that is particularly suited to being mounted on the charcoal canister 18. The fuel vapor pressure management apparatus 20 includes a housing 30 that can be mounted to the body of the charcoal canister 18 by a "bayonet" style attachment 32. A seal (not shown) can be interposed between the charcoal canister 18 and the fuel vapor pressure management apparatus 20 so as to provide a fluid tight connection. The attachment 32, in combination with a snap finger 33, allows the fuel vapor pressure management apparatus 20 to be readily serviced in the field. Of course, different styles of attachments between the fuel vapor pressure management apparatus 20 and the body of the charcoal canister 18 can be substituted for the illustrated bayonet attachment 32. Examples of different attachments include a threaded attachment, and an interlocking telescopic attachment. Alternatively, the charcoal canister 18 and the housing 30 can be bonded together (e.g., using an adhesive), or the body of the charcoal canister 18 and the housing 30 can be interconnected via an intermediate member such as a rigid pipe or a flexible hose.

The housing 30 defines an interior chamber 31 and can be an assembly of a first housing part 30*a* and a second housing part 30*b*. The first housing part 30*a* includes a first port 36 that provides fluid communication between the charcoal canister 18 and the interior chamber 31. The second housing part 30*b* includes a second port 38 that provides fluid communication, e.g., venting, between the interior chamber 31 and the ambient atmosphere. A filter (not shown) can be interposed between the second port 38 and the ambient atmosphere for reducing contaminants that could be drawn into the fuel vapor pressure management apparatus 20 during the vacuum relief 24 or during operation of the purge valve 16.

In general, it is desirable to minimize the number of housing parts to reduce the number of potential leak points, i.e., between housing pieces, which must be sealed.

An advantage of the fuel vapor pressure management apparatus 20 is its compact size. The volume occupied by the fuel vapor pressure management apparatus 20, including the interior chamber 31, is less than all other known leak detection devices, the smallest of which occupies more than 240 cubic centimeters. That is to say, the fuel vapor pressure management apparatus 20, from the first port 36 to the second port 38 and including the interior chamber 31, occupies less than 240 cubic centimeters. In particular, the fuel vapor pressure management apparatus 20 occupies a volume of less than 100 cubic centimeters. This size reduction over known leak detection devices is significant given the limited availability of space in contemporary automobiles.

A pressure operable device 40 can separate the interior chamber 31 into a first portion 31*a* and a second portion 31*b*. The first portion 31*a* is in fluid communication with the charcoal canister 18 through the first port 36, and the second portion 31*b* is in fluid communication with the ambient atmosphere through the second port 38.

The pressure operable device 40 includes a poppet 42, a seal 50, and a resilient element 60. During the signaling 22, the poppet 42 and the seal 50 cooperatively engage one another to prevent fluid communication between the first and second ports 36,38. During the vacuum relief 24, the poppet 42 and the seal 50 cooperatively engage one another to permit restricted fluid flow from the second port 38 to the first port 36. During the pressure blow-off 26, the poppet 42 and the seal 50 disengage one another to permit substantially unrestricted fluid flow from the first port 36 to the second port 38.

The pressure operable device 40, with its different arrangements of the poppet 42 and the seal 50, may be considered to constitute a bidirectional check valve. That is to say, under a first set of conditions, the pressure operable device 40 permits fluid flow along a path in one direction, and under a second set of conditions, the same pressure operable device 40 permits fluid flow along the same path in the opposite direction. The volume of fluid flow during the pressure blow-off 26 may be three to ten times as great as the volume of fluid flow during the vacuum relief 24.

The pressure operable device 40 operates without an electromechanical actuator, such as a solenoid that is used in a known leak detection device to controllably displace a fluid flow control valve. Thus, the operation of the pressure operable device 40 can be controlled exclusively by the pressure differential between the first and second ports 36,38. Preferably, all operations of the pressure operable device 40 are controlled by fluid pressure signals that act on one side, i.e., the first port 36 side, of the pressure operable device 40.

The pressure operable device 40 also operates without a diaphragm. Such a diaphragm is used in the known leak detection device to sub-partition an interior chamber and to actuate the flow control valve. Thus, the pressure operable device 40 exclusively separates, and then only intermittently, the interior chamber 31. That is to say, there are at most two portions of the interior chamber 31 that are defined by the housing 30.

The poppet 42 is preferably a low density, substantially rigid disk through which fluid flow is prevented. The poppet 42 can be flat or formed with contours, e.g., to enhance rigidity or to facilitate interaction with other components of the pressure operable device 40.

The poppet 42 can have a generally circular form that includes alternating tabs 44 and recesses 46 around the perimeter of the poppet 42. The tabs 44 can center the poppet 42 within the second housing part 30*b*, and guide movement of the poppet 42 along an axis A. The recesses 46 can provide a fluid flow path around the poppet 42, e.g., during the vacuum relief 24 or during the pressure blow-off 26. A plurality of alternating tabs 44 and recesses 46 are illustrated, however, there could be any number of tabs 44 or recesses 46, including none, e.g., a disk having a circular perimeter. Of course, other forms and shapes may be used for the poppet 42.

The poppet 42 can be made of any metal (e.g., aluminum), polymer (e.g., nylon), or another material that is impervious to fuel vapor, is low density, is substantially rigid, and has a smooth surface finish. The poppet 42 can be manufactured by stamping, casting, or molding. Of course, other materials and manufacturing techniques may be used for the poppet 42.

The seal 50 can have an annular form including a bead 52 and a lip 54. The bead 52 can be secured between and seal the first housing part 30*a* with respect to the second housing part 30*b*. The lip 54 can project radially inward from the bead 52 and, in its undeformed configuration, i.e., as-molded or otherwise produced, project obliquely with respect to the axis A. Thus, preferably, the lip 54 has the form of a hollow frustum. The seal 50 can be made of any material that is sufficiently elastic to permit many cycles of flexing the seal 50 between undeformed and deformed configurations.

Preferably, the seal 50 is molded from rubber or a polymer, e.g., nitrites or fluorosilicones. More preferably, the seal has a stiffness of approximately 50 durometer (Shore A), and is self-lubricating or has an anti-friction coating, e.g., polytetrafluoroethylene.

Figure 2B:
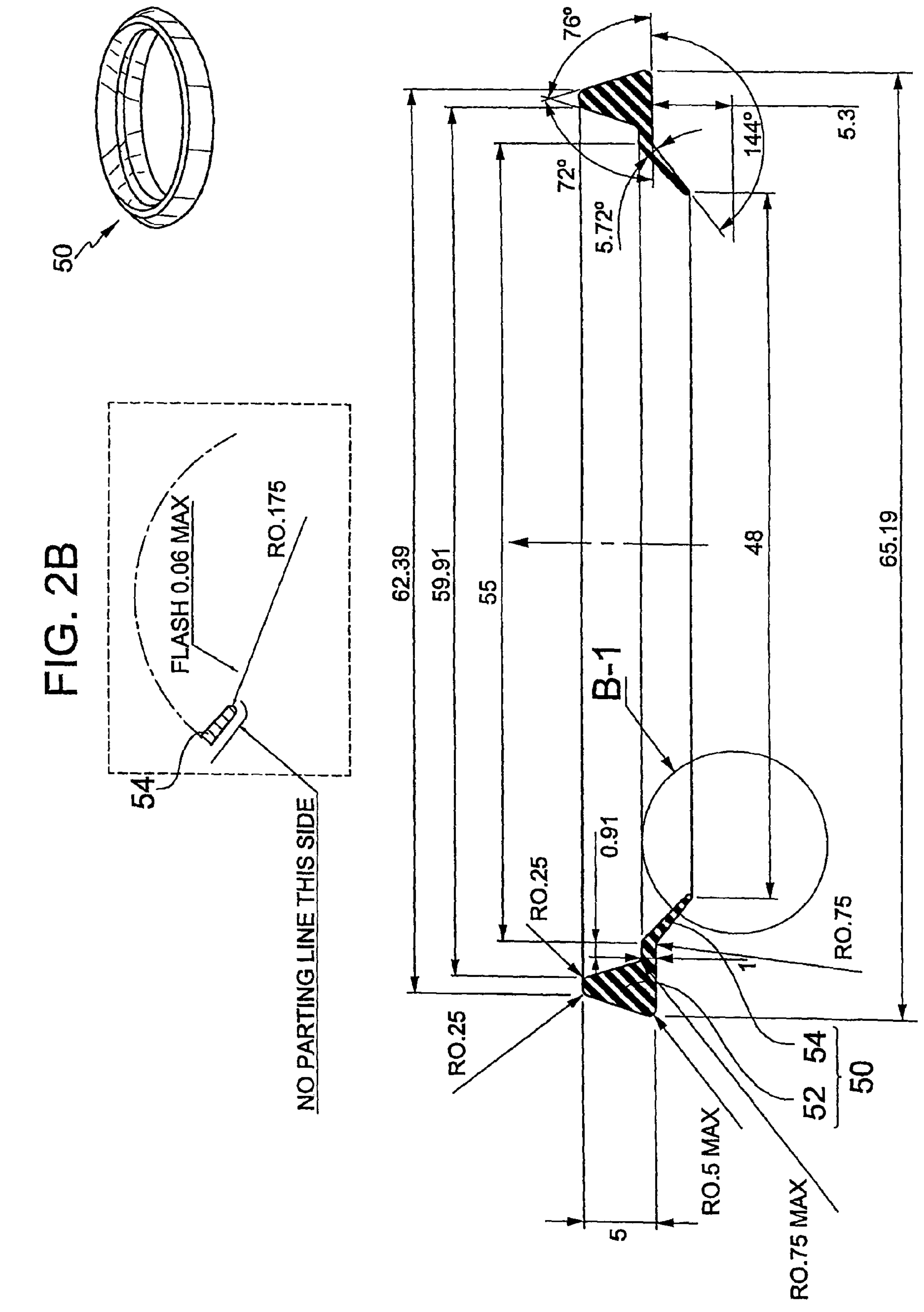
FIG. 2B are detail views of a seal for the fuel vapor pressure management apparatus shown in FIG. 2A.

FIG. 2B shows an exemplary embodiment of the seal 50, including the relative proportions of the different features. Preferably, this exemplary embodiment of the seal 50 is made of Santoprene 123–40.

The resilient element 60 biases the poppet 42 toward the seal 50. The resilient element 60 can be a coil spring that is positioned between the poppet 42 and the second housing part 30*b*. Preferably, such a coil spring is centered about the axis A.

Different embodiments of the resilient element 60 can include more than one coil spring, a leaf spring, or an elastic block. The different embodiments can also include various materials, e.g., metals or polymers. And the resilient element 60 can be located differently, e.g., positioned between the first housing part 30*a* and the poppet 42.

It is also possible to use the weight of the poppet 42, in combination with the force of gravity, to urge the poppet 42 toward the seal 50. As such, the biasing force supplied by the resilient element 60 could be reduced or eliminated.

The resilient element 60 provides a biasing force that can be calibrated to set the value of the first predetermined pressure level. The construction of the resilient element 60, in particular the spring rate and length of the resilient member, can be provided so as to set the value of the second predetermined pressure level.

A switch 70 can perform the signaling 22. Preferably, movement of the poppet 42 along the axis A actuates the switch 70. The switch 70 can include a first contact fixed with respect to a body 72 and a movable contact 74. The body 72 can be fixed with respect to the housing 30, e.g., the first housing part 30*a*, and movement of the poppet 42 displaces movable contact 74 relative to the body 72, thereby closing or opening an electrical circuit in which the switch 70 is connected. In general, the switch 70 is selected so as to require a minimal actuation force, e.g., 50 grams or less, to displace the movable contact 74 relative to the body 72.

Different embodiments of the switch 70 can include magnetic proximity switches, piezoelectric contact sensors, or any other type of device capable of signaling that the poppet 42 has moved to a prescribed position or that the poppet 42 is exerting a prescribed force on the movable contact 74.

Figure 4:
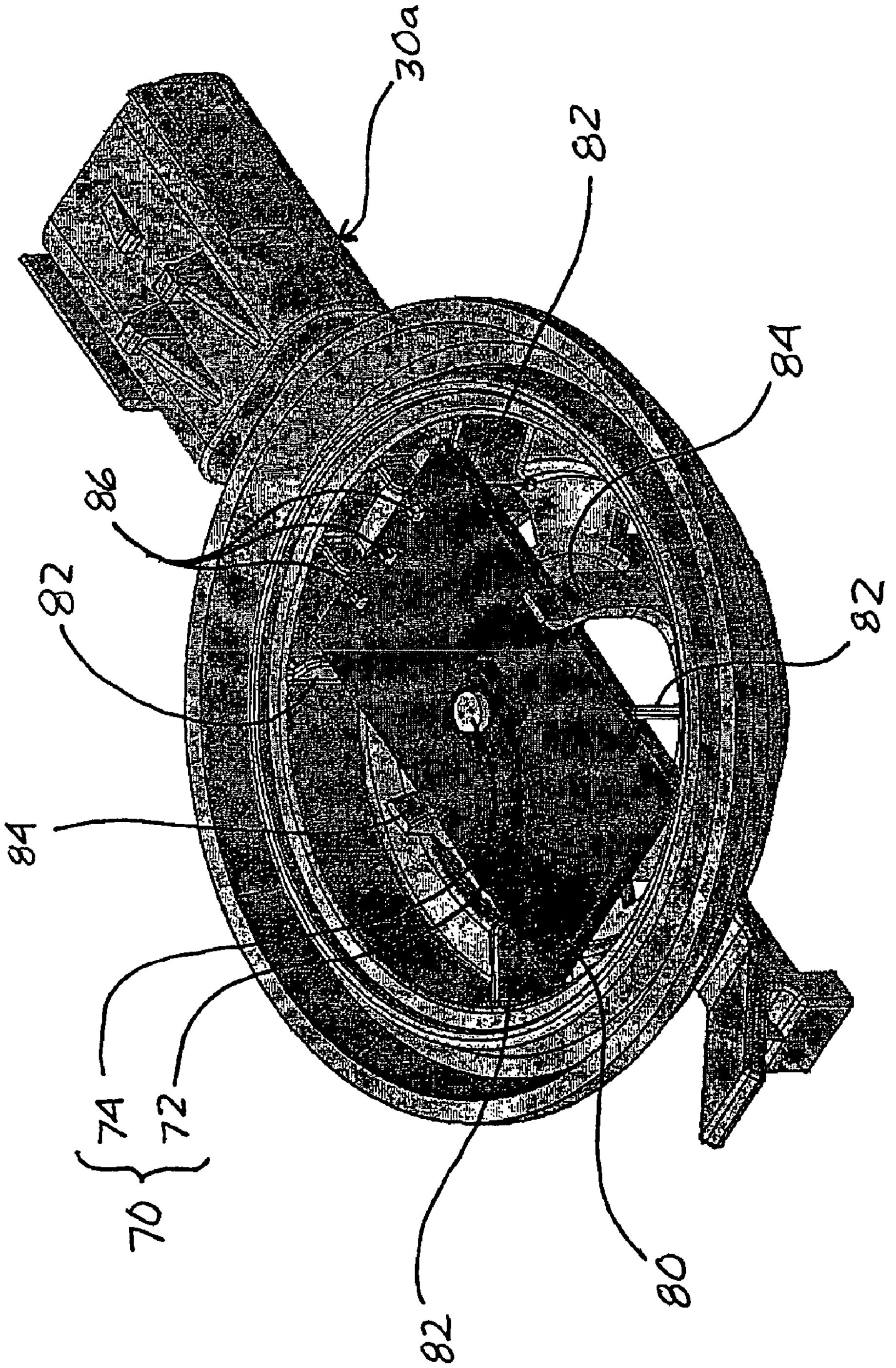
FIG. 4 is a detail view showing a printed circuit board of the fuel vapor pressure management apparatus illustrated in FIG. 1

Referring additionally to FIG. 4, a printed circuit board 80 is shown mounted on first housing part 30*a*. The printed circuit board 80 supports the switch 70 in the proper position to be actuated by the poppet 42 when the first predetermined pressure level occurs in the vapor pressure canister 18. In turn, referring to FIGS. 4 and 2A, the printed circuit board 80 is supported by a plurality of ribs 82, including a rib 82*a* that is located directly underneath the switch 70, and at least one latch 84 (two are shown in FIG. 4) that secures the printed circuit board 80 against the ribs 82. Electrical communication between the switch 70 and the electronic control unit 76 is via a plurality of conductors 86 (three are shown) and a control circuit that is printed on the printed circuit board 80.

The fuel vapor pressure management apparatus 20 enables different types of the printed circuit board 80 to be placed in the first housing part 30*a*. According to one embodiment, only the electrical lines necessary to connect the stationary and movable contacts 72,74 are printed on the printed circuit board 80. However, according to another embodiment, various functions and levels of logic can be moved from the electronic control unit 76 to the printed circuit board 80 by adding additional control circuit features on the printed circuit board 80. Examples of such features can include a temperature sensor or a latch that is controlled by the switch 70. Also, different sizes of the printed circuit board 80 can be placed in the first housing part 30*a*, provided that the latch(es) 84 can secure the printed circuit board 80 and that the conductors 86 mate with the printed circuit board 80.

The printed circuit board 80 also facilitates additional embodiments for the switch 70. For example, the movable contact 74 can be a domed metal piece that can be pressed, in an over-center or snap motion, by the poppet 42 into a flattened state so as to make electrical contact with the stationary contact 72, which is located on the printed circuit board 80 under the dome of the movable contact 74. An example of such a switch is the Panasonic EVQ.

Figure 2C:
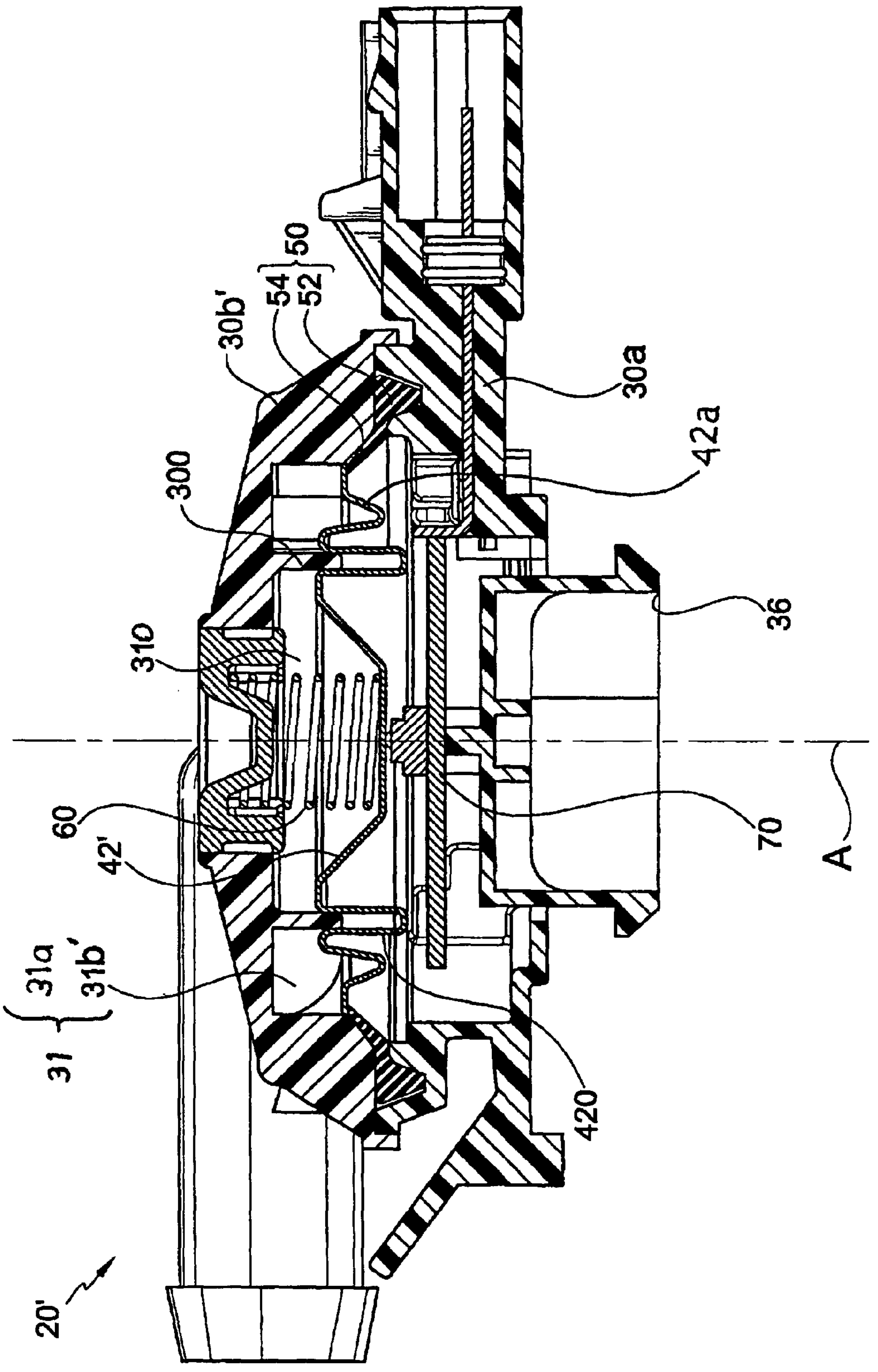
FIG. 2C is a second cross sectional view of the fuel vapor pressure management apparatus illustrated in FIG. 1.

Referring now to FIG. 2C, there is shown an alternate embodiment of the fuel vapor pressure management apparatus 20'. As compared to FIG. 2A, the fuel vapor pressure management apparatus 20' provides an alternative second housing part 30*b*' and an alternate poppet 42'. Otherwise, the same reference numbers are used to identify similar parts in the two embodiments of the fuel vapor pressure management apparatus 20 and 20'.

The second housing part 30*b*' includes a wall 300 projecting into the chamber 31 and surrounding the axis A. The poppet 42' includes at least one corrugation 420 that also surrounds the axis A. The wall 300 and the at least one corrugation 420 are sized and arranged with respect to one another such that the corrugation 420 telescopically receives the wall 300 as the poppet 42' moves along the axis A, i.e., to provide a dashpot type structure. Preferably, the wall 300 and the at least one corrugation 420 are right-circle cylinders.

The wall 300 and the at least one corrugation 420 cooperatively define a sub-chamber 310 within the chamber 31*b*'. Movement of the poppet 42' along the axis A causes fluid displacement between the chamber 31*b*' and the sub-chamber 310. This fluid displacement has the effect of damping resonance of the poppet 42'. A metering aperture (not show) could be provided to define a dedicated flow channel for the displacement of fluid between the chamber 31*b*' and the sub-chamber 310.

As it is shown in FIG. 2C, the poppet 42' can include additional corrugations that can enhance the rigidity of the poppet 42', particularly in the areas at the interfaces with the seal 50 and the resilient element 60.

The signaling 22 occurs when vacuum at the first predetermined pressure level is present at the first port 36. During the signaling 22, the poppet 42 and the seal 50 cooperatively engage one another to prevent fluid communication between the first and second ports 36,38.

The force created as a result of vacuum at the first port 36 causes the poppet 42 to be displaced toward the first housing part 30*a*. This displacement is opposed by elastic deformation of the seal 50. At the first predetermined pressure level, e.g., one inch of water vacuum relative to the atmospheric pressure, displacement of the poppet 42 will actuate the switch 70, thereby opening or closing an electrical circuit that can be monitored by an electronic control unit 76. As vacuum is released, i.e., the pressure at the first port 36 rises above the first predetermined pressure level, the elasticity of the seal 50 pushes the poppet 42 away from the switch 70, thereby resetting the switch 70.

Figure 3A:
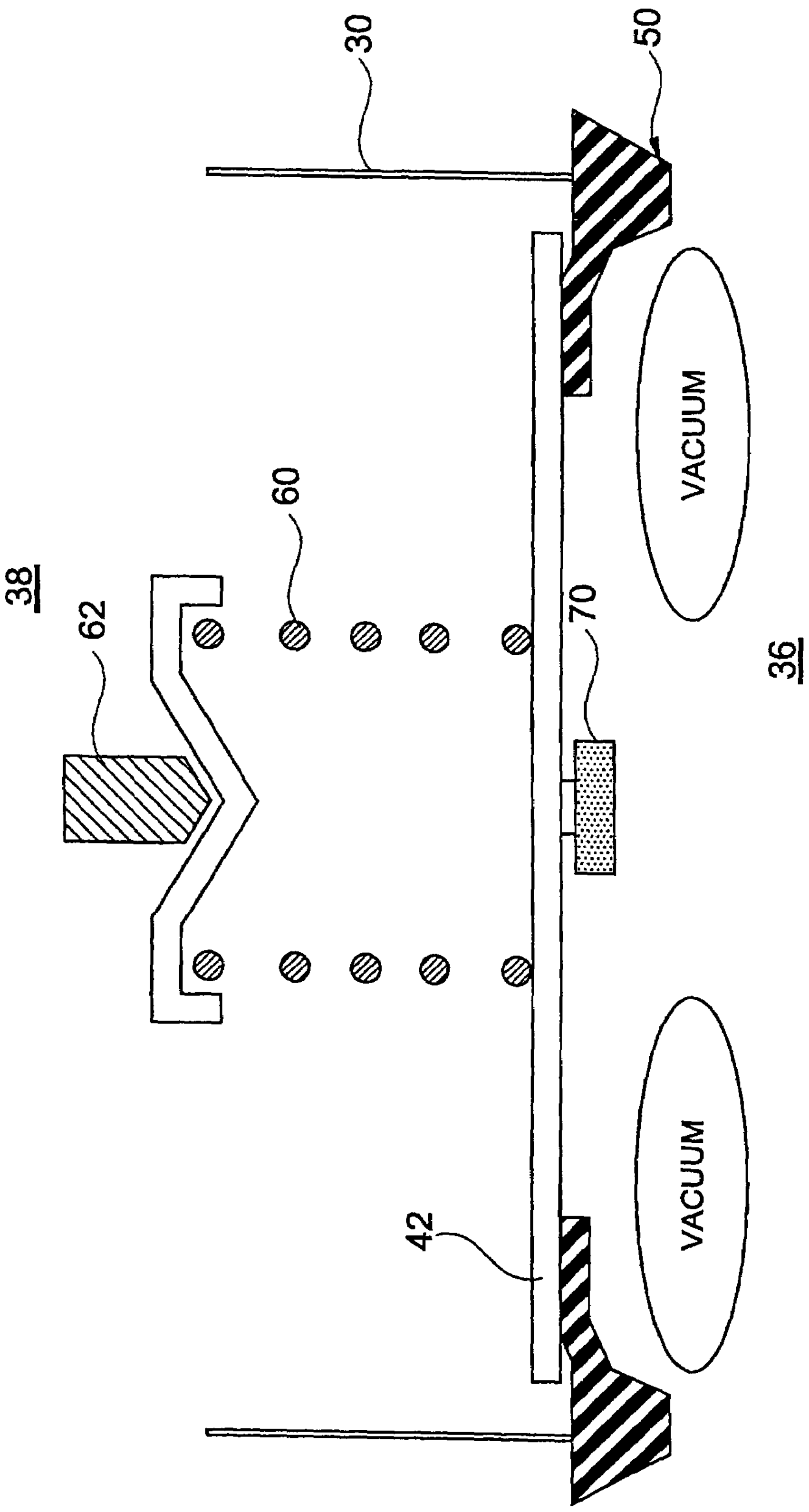
FIG. 3A is a schematic illustration of a leak detection arrangement of the fuel vapor pressure management apparatus illustrated in FIG. 1.

During the signaling 22, there is a combination of forces that act on the poppet 42, i.e., the vacuum force at the first port 36 and the biasing force of the resilient element 60. This combination of forces moves the poppet 42 along the axis A to a position that deforms the seal 50 in a substantially symmetrical manner. This arrangement of the poppet 42 and seal 50 are schematically indicated in FIG. 3A. In particular, the poppet 42 has been moved to its extreme position against the switch 70, and the lip 54 has been substantially uniformly pressed against the poppet 42 such that there is, preferably, annular contact between the lip 54 and the poppet 42.

In the course of the seal 50 being deformed during the signaling 22, the lip 54 slides along the poppet 42 and performs a cleaning function by scraping-off any debris that may be on the poppet 42.

The vacuum relief 24 occurs as the pressure at the first port 36 further decreases, i.e., the pressure decreases below the first predetermined pressure level that actuates the switch 70. At some level of vacuum that is below the first predetermined level, e.g., six inches of water vacuum relative to atmosphere, the vacuum acting on the seal 50 will deform the lip 54 so as to at least partially disengage from the poppet 42.

Figure 3B:
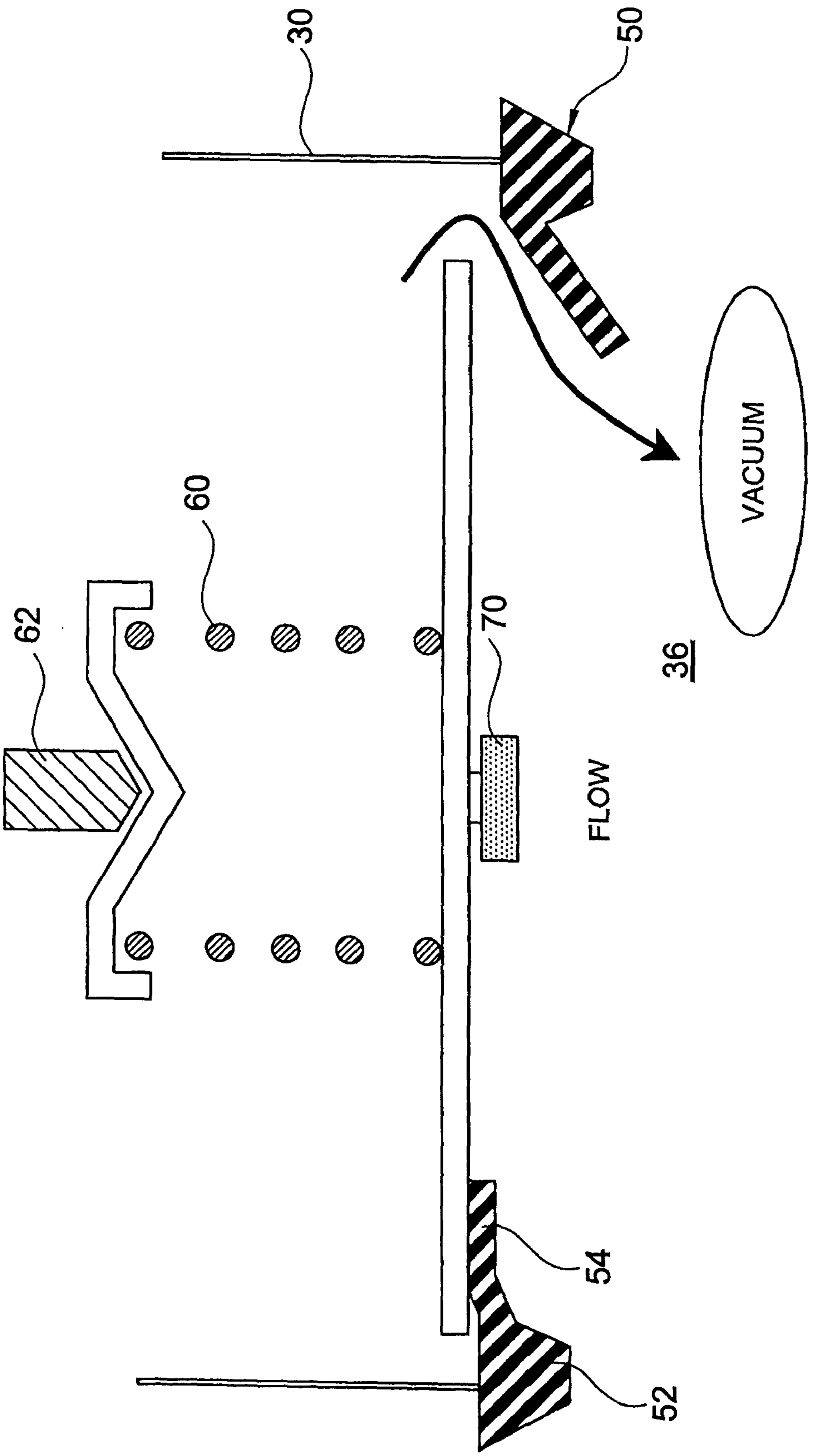
FIG. 3B is a schematic illustration of a vacuum relief arrangement of the fuel vapor pressure management apparatus illustrated in FIG. 1.

During the vacuum relief 24, it is believed that, at least initially, the vacuum relief 24 causes the seal 50 to deform in an asymmetrical manner. This arrangement of the poppet 42 and seal 50 are schematically indicated in FIG. 3B. A weakened section of the seal 50 could facilitate propagation of the deformation. In particular, as the pressure decreases below the first predetermined pressure level, the vacuum force acting on the seal 50 will, at least initially, cause a gap between the lip 54 and the poppet 42. That is to say, a portion of the lip 54 will disengage from the poppet 42 such that there will be a break in the annular contact between the lip 54 and the poppet 42, which was established during the signaling 22. The vacuum force acting on the seal 50 will be relieved as fluid, e.g., ambient air, flows from the atmosphere, through the second port 38, through the gap between the lip 54 and the poppet 42, through the first port 36, and into the canister 18.

The fluid flow that occurs during the vacuum relief 24 is restricted by the size of the gap between the lip 54 and the poppet 42. It is believed that the size of the gap between the lip 54 and the poppet 42 is related to the level of the pressure below the first predetermined pressure level. Thus, a small gap is all that is formed to relieve pressure slightly below the first predetermined pressure level, and a larger gap is formed to relieve pressure that is significantly below the first predetermined pressure level. This resizing of the gap is performed automatically by virtue of the seal 50 cooperating with the poppet 42. Preferably, the poppet 42 is shaped, e.g., includes a corrugation 42*a*, such that the lip 54 moves along the surface of the corrugation 42*a*. Consequently, fluid flow at the interface between the poppet 42 and the lip 54 is "feathered-in," i.e., is progressively adjusted, and is believed to eliminate fluid flow pulsations. Such pulsations could arise due to the vacuum force being relieved momentarily during disengagement, but then building back up as soon as the seal 50 is reengaged with the poppet 42.

Figure 3C:
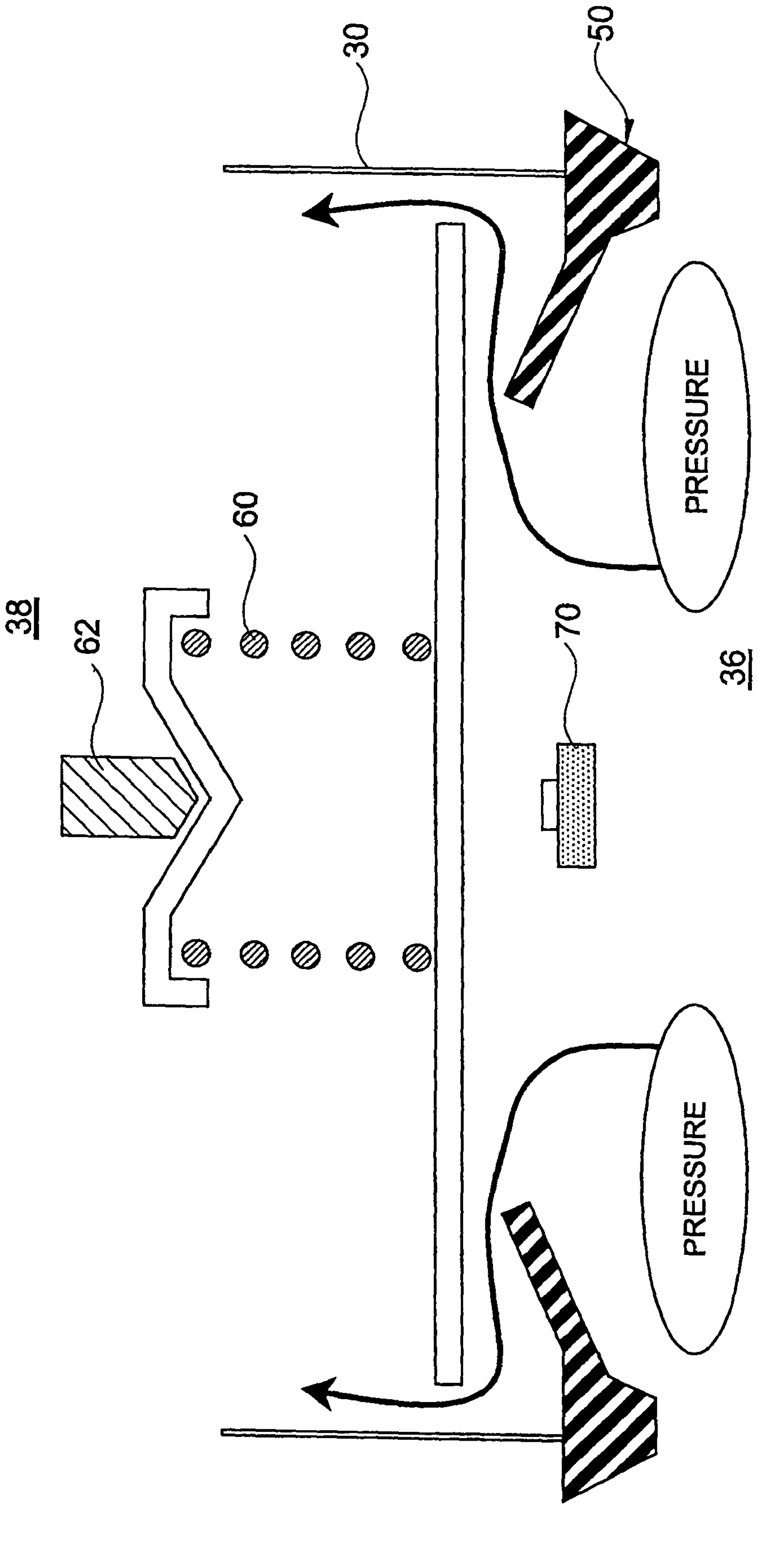
FIG. 3C is a schematic illustration of a pressure blow-off arrangement of the fuel vapor pressure management apparatus illustrated in FIG. 1.

Referring now to FIG. 3C, the pressure blow-off 26 occurs when there is a positive pressure above a second predetermined pressure level at the first port 36. For example, the pressure blow-off 26 can occur when the tank 12 is being refueled. During the pressure blow-off 26, the poppet 42 is displaced against the biasing force of the resilient element 60 so as to space the poppet 42 from the lip 54. That is to say, the poppet 42 will completely separate from the lip 54 so as to eliminate the annular contact between the lip 54 and the poppet 42, which was established during the signaling 22. This separation of the poppet 42 from the seal 50 enables the lip 54 to assume an undeformed configuration, i.e., it returns to its "as-originally-manufactured" configuration. The pressure at the second predetermined pressure level will be relieved as fluid flows from the canister 18, through the first port 36, through the space between the lip 54 and the poppet 42, through the second port 38, and into the atmosphere.

The fluid flow that occurs during the pressure blow-off 26 is substantially unrestricted by the space between the poppet 42 and the lip 54. That is to say, the space between the poppet 42 and the lip 54 presents very little restriction to the fluid flow between the first and second ports 36,38.

At least four advantages are achieved in accordance with the operations performed by the fuel vapor pressure management apparatus 20. First, providing a leak detection diagnostic using vacuum monitoring during natural cooling, e.g., after the engine is turned off. Second, providing relief for vacuum below the first predetermined pressure level, and providing relief for positive pressure above the second predetermined pressure level. Third, vacuum relief provides fail-safe purging of the canister 18. And fourth, the relieving pressure 26 regulates the pressure in the fuel tank 12 during any situation in which the engine is turned off, thereby limiting the amount of positive pressure in the fuel tank 12 and allowing the cool-down vacuum effect to occur sooner.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A fuel vapor pressure management apparatus of a fuel system supplying fuel to an internal combustion engine, the fuel vapor pressure management apparatus performing leak detection on a headspace of the fuel system, performing excess negative pressure relief of the headspace, and performing excess positive pressure relief of the headspace, the apparatus comprising:

a housing defining an interior chamber, the interior chamber being in fluid communication with the headspace of the fuel system;

a pressure operable device separating the interior chamber into first and second portions, the pressure operable device including a poppet movable along an axis and a seal adapted to cooperatively engage the poppet; and a printed circuit board supported by the housing in the interior chamber, the printed circuit board including a sensor adapted to be actuated by movement of the poppet along the axis.

2. A fuel vapor pressure management apparatus of a fuel system supplying fuel to an internal combustion engine, the fuel vapor pressure management apparatus performing leak detection on a headspace of the fuel system, performing excess negative pressure relief of the headspace, and performing excess positive pressure relief of the headspace, the apparatus comprising:

a housing defining an interior chamber;

a pressure operable device separating the interior chamber into first and second portions, the pressure operable device including a poppet movable along an axis and a seal adapted to cooperatively engage the poppet; and a printed circuit board supported by the housing in the interior chamber, the printed circuit board including sensor adapted to be actuated by movement of the poppet along the axis, wherein the housing comprises at least one latch movable between first and second configurations, the first configuration retains the printed circuit board with respect to the housing, and the second configuration releases the printed circuit board with respect to the housing.

3. The fuel vapor pressure management apparatus according to claim 2, wherein the housing comprises at least one post positioning the printed circuit board with respect to the housing.

4. The fuel vapor pressure management apparatus according to claim 3, wherein the printed circuit board in the first configuration is retained contiguously between the at least one latch and the at least one post.

5. The fuel vapor pressure management apparatus according to claim 4, wherein the at least one latch comprises a plurality of latches, and the at least one post comprises a plurality of posts.

6. The fuel vapor pressure management apparatus according to claim 2, wherein the at least one post comprises a centered post contiguously engaging the printed circuit board and aligned with the sensor.

7. The fuel vapor pressure management apparatus according to claim 6, wherein the centered post and the sensor are aligned along the axis.

8. The fuel vapor pressure management apparatus according to claim 2, wherein the printed circuit board is interchangeable with a substitute printed circuit board.

9. The fuel vapor pressure management apparatus according to claim 8, wherein the printed circuit board comprises a first width, a first length, and a first axial thickness, the substitute printed circuit board comprises a second width, a second length, and a second axial thickness; and wherein the first and second widths are substantially equal, the first and second lengths are unequal, and the first and second axial thicknesses are substantially equal.

10. The fuel vapor pressure management apparatus according to claim 1, wherein the sensor comprises at least one of a contact switch and a proximity sensor.

11. The fuel vapor pressure management apparatus according to claim 1, wherein the printed circuit board comprises a plurality of electrical components that include the sensor.

12. The fuel vapor pressure management apparatus according to claim 11, wherein the printed circuit board comprises a plurality of electrically conductive paths that electrically couple the plurality of electrical components.

13. A fuel vapor pressure management apparatus of a fuel system supplying fuel to an internal combustion engine, the fuel vapor pressure management apparatus performing leak detection on a headspace of the fuel system, performing excess negative pressure relief of the headspace, and performing excess positive pressure relief of the headspace, the apparatus comprising:

a housing defining an interior chamber;

a pressure operable device separating the interior chamber into first and second portions, the pressure operable device including a poppet movable along an axis and a seal adapted to cooperatively engage the poppet; and a printed circuit board supported by the housing in the interior chamber, the printed circuit board including sensor adapted to be actuated by movement of the poppet along the axis, the sensor comprising a contact switch that is adapted to be contiguously engaged by the poppet.

14. A method of assembling a fuel vapor pressure management apparatus of a fuel system supplying fuel to an internal combustion engine, the fuel vapor pressure management apparatus performing leak detection on a headspace of the fuel system, performing excess negative pressure relief of the headspace, and performing excess positive pressure relief of the headspace, the method comprising:

providing first and second housing parts, the first and second housing parts are adapted to cooperatively engage one another so as to form a housing that defines an interior chamber;

locating within the first housing part a printed circuit board; and sandwiching between the first and second housing parts a pressure operable device separating the interior chamber into first and second portions wherein the providing the first housing part comprises forming at least one latch adapted to retain with respect to the first housing part the printed circuit board during the locating.

15. The method according to claim 14, wherein the providing the first housing part comprises forming at least one post adapted to position with respect to the first housing part the printed circuit board during the locating.

16. The method according to claim 15, wherein the locating comprises the at least one latch and the at least one post contiguously retaining the printed circuit board with respect to the first housing part.

17. The method according to claim 14, further comprising:

interchanging the printed circuit board and a substitute printed circuit board.

18. The method according to claim 17, wherein the interchanging comprises removing the printed circuit board from the first housing part, and installing the substitute printed circuit board.

19. The method according to claim 18, wherein the removing comprises moving the at least one latch to a first configuration releasing the printed circuit board, and the installing comprises moving the at least one latch to a second configuration retaining the substitute printed circuit board.

20. The method according to claim 17, the printed circuit board comprises a first width, a first length, and a first thickness, the substitute printed circuit board comprises a second width, a second length, and a second thickness; and wherein the first and second widths are substantially equal, the first and second lengths are unequal, and the first and second thicknesses are substantially equal.

* * * * *